United States Patent [19]

Searby et al.

[11] Patent Number: 5,357,265

[45] Date of Patent: Oct. 18, 1994

[54] ELECTRONIC GRAPHIC SYSTEM

[75] Inventors: Anthony D. Searby; Paul R. N. Kellar, both of Newbury, England

[73] Assignee: Quantel Limited, Newbury, England

[21] Appl. No.: 665,300

[22] Filed: Mar. 6, 1991

Related U.S. Application Data

[63] Continuation-in-part of Ser. No. 510,162, Apr. 17, 1990, Pat. No. 5,276,787.

[30] Foreign Application Priority Data

Jan. 31, 1991 [GB] United Kingdom ............... 9102092.5

[51] Int. Cl.⁵ .............................................. G06F 15/72
[52] U.S. Cl. ..................................... 345/153; 345/179; 178/18
[58] Field of Search ................ 340/706, 709, 710, 703, 340/708, 798; 239/346; 178/18, 19; 345/113, 153, 179; 395/132

[56] References Cited

U.S. PATENT DOCUMENTS

| | | | |
|---|---|---|---|
| 2,264,564 | 12/1941 | Connor | 239/346 |
| 4,313,113 | 1/1982 | Thornbury | 340/709 |
| 4,514,818 | 4/1985 | Walker | 340/703 X |
| 4,524,421 | 6/1985 | Searby et al. | 340/703 X |
| 4,533,416 | 12/1986 | Walker | 340/710 X |
| 4,552,360 | 11/1985 | Bromley et al. | 340/709 |
| 4,667,182 | 5/1987 | Murphy | 340/708 |
| 5,175,625 | 12/1992 | Miles | 358/183 |
| 5,276,787 | 1/1993 | Searby | 395/132 |

FOREIGN PATENT DOCUMENTS

| | | | |
|---|---|---|---|
| 0202747 | 4/1986 | European Pat. Off. | G06F 15/72 |
| 0403054 | 4/1990 | European Pat. Off. | G06F 15/72 |
| 2207587 | 6/1988 | United Kingdom | G06F 15/72 |

OTHER PUBLICATIONS

*MacPaint* Macintosh; Apple Computer Incorporated, 1983.

Primary Examiner—Alvin E. Oberley
Assistant Examiner—Kara A. Farnandez
Attorney, Agent, or Firm—Cooper & Dunham

[57] ABSTRACT

An electronic graphic system (1) comprises a memory (2) for storing data representing an image and a user operable stylus and touch tablet combination (4) by which the user can select a notional painting implement a color with which to paint and can create data defining positions in the image at which painting is to occur. An address generator (5) is arranged to generate address data identifying addresses in the memory (2) corresponding to the user created position data. The stylus and touch tablet (4) is pressure sensitive and generates a parameter depending on the pressure applied via the stylus by the user. The address generator (5) generates address data at intervals dependent on the instantaneous value of the pressure related parameter. In one embodiment the interval is a distance between identified addresses in the memory (2) and in another embodiment the interval is a period of time. In this way the system simulates an implement having a paint flow rate which is pressure related. The stylus may be connectable to a source of pressurized air and arranged so as to simulate the feel of an airbrush.

16 Claims, 3 Drawing Sheets

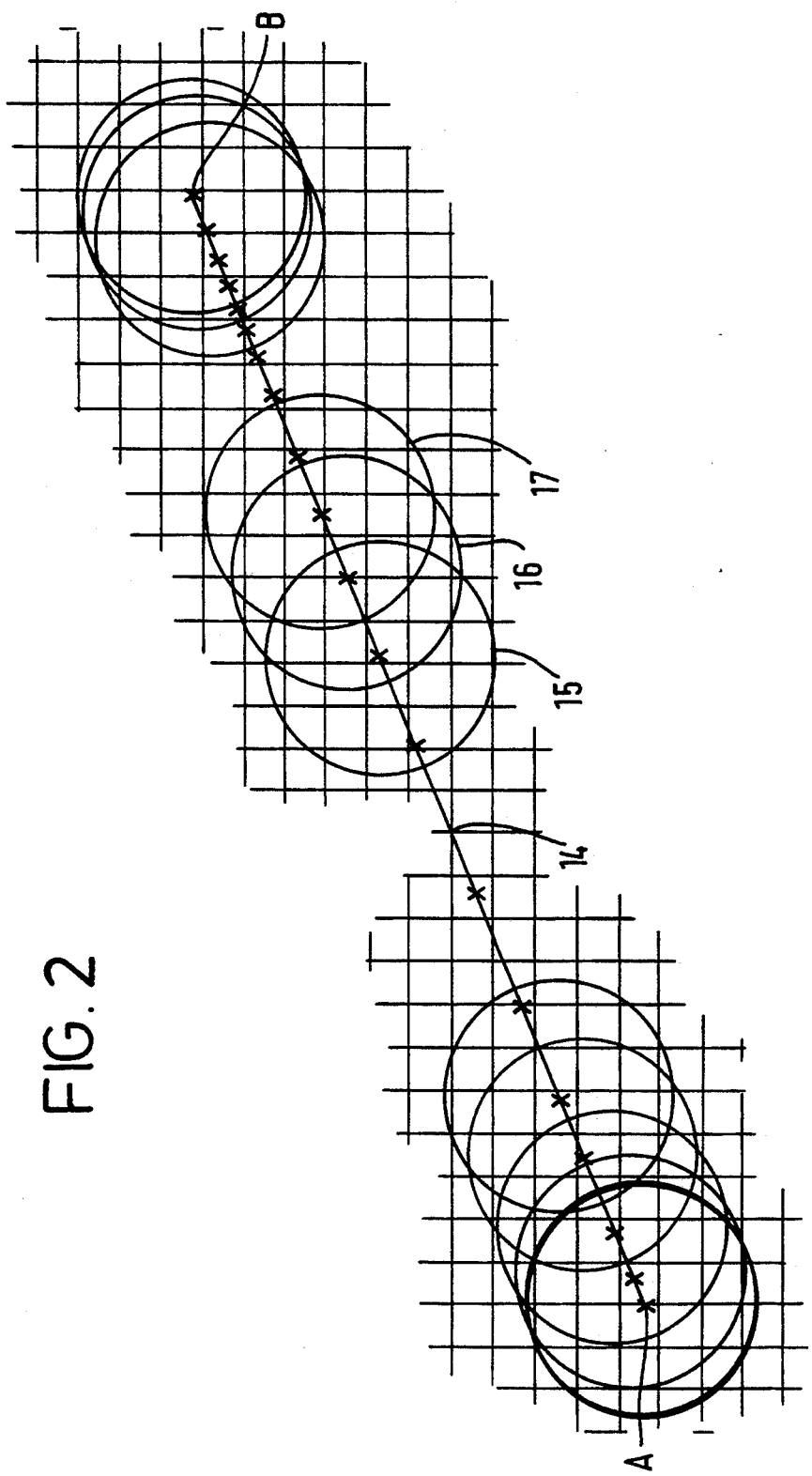

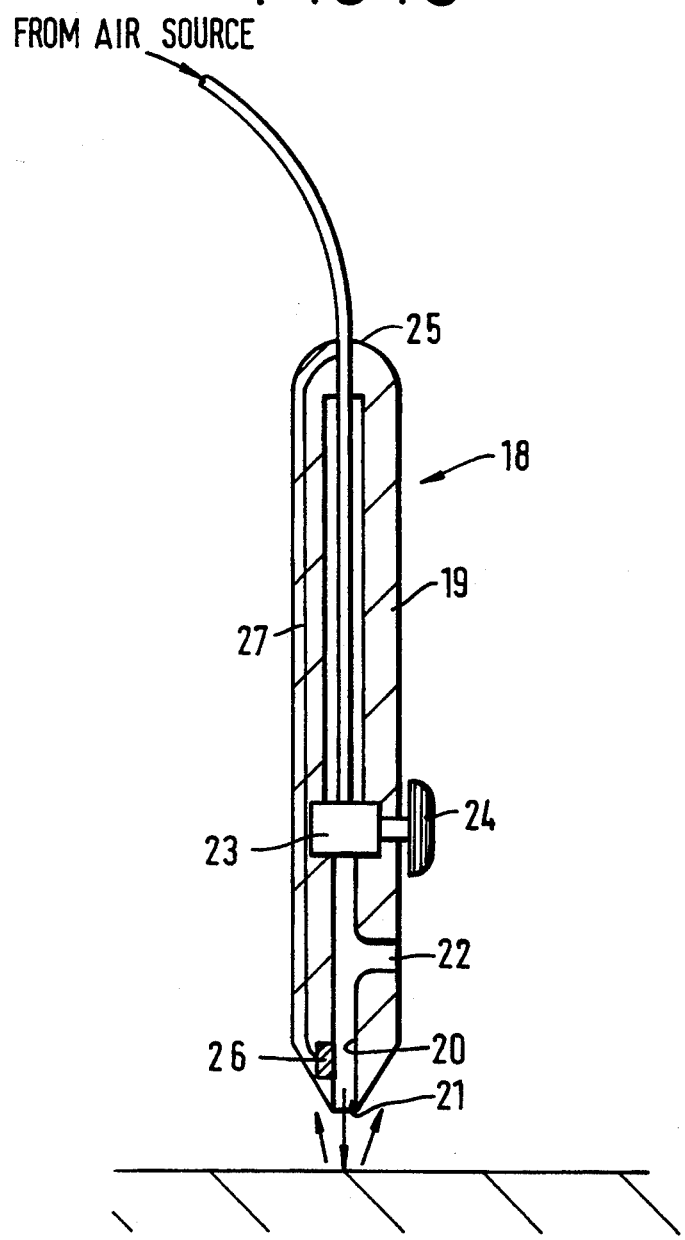

ELECTRONIC GRAPHIC SYSTEM

This application is a continuation-in-part of U.S. application Ser. No. 07/510,162 filed Apr. 17, 1990 (now U.S. Pat. No. 5,276,787).

BACKGROUND OF THE INVENTION

The invention relates to electronic graphic systems.

Electronic graphic or image systems in which the painting or drawing of a color image can be simulated, or a portion of one image can be merged into another by electronic means are well known. One such graphic system is described in our British patent number 2,089,625 and corresponding U.S. Pat. No. 4,514,818, the teachings of which are incorporated herein by reference. This system includes a user operable input device which may be used by the user to select from a range of colors and a range of intensities and to choose from a set of notional drawing implements for use in the painting or drawing.

When a color is chosen by the user, values representing the components of the selected color are stored in a color register. An implement is chosen by selecting from among different implement representations displayed on a display screen and the selected implement is defined by parameters conforming a 3-dimensional surface representing the profile of the implement. Generally speaking the implement profile will have a high center falling away to a lower value toward the periphery of the profile although other profiles may, of course, be defined. The implement profile represents the notional distribution of color which would be applied by the implement to the image over the area of the image which it covers.

The user operable input device is preferably a touch tablet and stylus combination. The touch tablet is arranged to generate position signals designating the position of the stylus relative to the touch tablet when the stylus is brought into proximity. When the stylus is applied to the touch tablet a pressure signal representing the pressure applied via the stylus to the touch tablet is output from the stylus and stored in a pressure signal register. For some implements, representing say paint brushes, position signals are allowed to be generated for each movement of the stylus by the distance between picture points or similar distance, whilst for other implements, say air brushes, position signals are generated at regular time intervals, even if the stylus is held stationary on the touch tablet.

When a position signal is produced, new video signals (pixels) are derived for every picture point in the patch covered by the selected implement. An image store is provided and each new pixel is written at the appropriate picture point in the store. Such new pixels are derived by a processing circuit in accordance with the selected color data and the distribution of the selected implement, and in response also to the pressure applied to the stylus and to the value of the pixel previously stored at the respective picture point in the store.

The user, who it is envisaged would normally be an artist lacking experience in the use of computer based systems, paints or draws by choosing a desired color and implement and then manipulating the stylus, causing the touch tablet to generate a series of position signals which define the path or positioning of the stylus. The processing circuit reads pixels from the image store for a patch of picture points in response to each position signal and these pixels are blended by the processor with signals representing the chosen color in proportions depending upon the respective values of the brush profile and pressure. The blend is then written back to the picture store replacing the pixels previously stored therein.

In general, the blending process is carried out a number of times for each picture point in the image store whether the implement is moving or stationary (assuming in the case of the moving implement that the patch covered by the implement is larger than the spacing between picture points). The final proportion will depend on the number of processing operations performed per pixel.

To enable the artist to observe his creation, the stored picture is read repeatedly and the pixels are applied to a TV-type color monitor, so that the build-up of the picture can be observed. Of course such systems are not limited to TV-type formats and any suitable video format may be adopted. The system described avoids the problem of jagged edges in the image, an unpleasant stepping appearance normally associated with lines not lying horizontally or vertically in a raster display.

The above described system provides for excellent simulation of the painting or drawing of an image, and the generation of position signals at regular time intervals or at regular distances enables the simulation of the most drawing implements. However, it is sometimes desirable to provide for more realistic simulation of implements where the flow rate of paint or ink is related to the pressure applied via the implement.

The present invention aims to provide for a more realistic simulation of a wider range of implements than has hitherto been possible.

The present invention also aims to provide a stylus/touch tablet which can realistically simulate the feel of an airbrush or other propulsive implement.

The present invention also aims to provide a system able to simulate painting using an implement with a pressure sensitive flow rate.

According to one aspect of the invention therefore, there is provided an electronic graphic system comprising:
  storing means for storing image data;
  means for providing brush profile data;
  user manipulatable input means for successively addressing positions in the stored image determined by said inputness after successive amounts of movement or time;
  processing means for combining user selected color image data with data in the storing means at positions under the control of said brush profile data;
  and wherein said user manipulatable input means includes means for generating a parameter dependent upon pressure applied by the user to said input means, and said parameter is used to vary the amounts of movement or time occurring between acts of addressing said store means thereby to vary the proportions in which the user selected color and the image date in the storing means are combined in response to variations in pressure applied to said input means.

According to another aspect of the invention there is provided an electronic graphic system in which image data representing an image is stored in a memory and modified in accordance with user defined data to create a modified image, the system comprising input means for identifying in the memory areas of data to be modified and modifying means for modifying data in an identified area by combining with it data representing a user selected color, the modifying means being arranged to effect said modification to an identified area at an interval determined by a parameter related to instantaneous pressure applied via the input means.

According to further aspect of the invention there is provided a stylus for use with an electronic graphic facility for the creation or manipulation of an image, the stylus comprising a housing defining an air passage connectable at one end portion to a pressurized gas source, a user operable valve means for constricting the passage, and a pressure sensor in the other end portion of the passage, the pressure sensor outputting a pressure related signal for interpretation by the electronic graphic facility.

The above and further features of the invention are set forth with particularity in the appended claims and together with advantages thereof will become clearer from consideration of the following detailed description of an exemplary embodiment of the invention given with reference to the accompanying drawings.

BRIEF DESCRIPTION OF THE DRAWINGS

In the drawings.

FIG. 2 illustrates the manner in which brush stamps are stamped into an image in the system shown in FIG. 1; and FIG. 3 is a schematic sectional view of a stylus adapted to represent an air brush.

DETAILED DESCRIPTION OF THE PREFERRED EMBODIMENT

Figure 1:
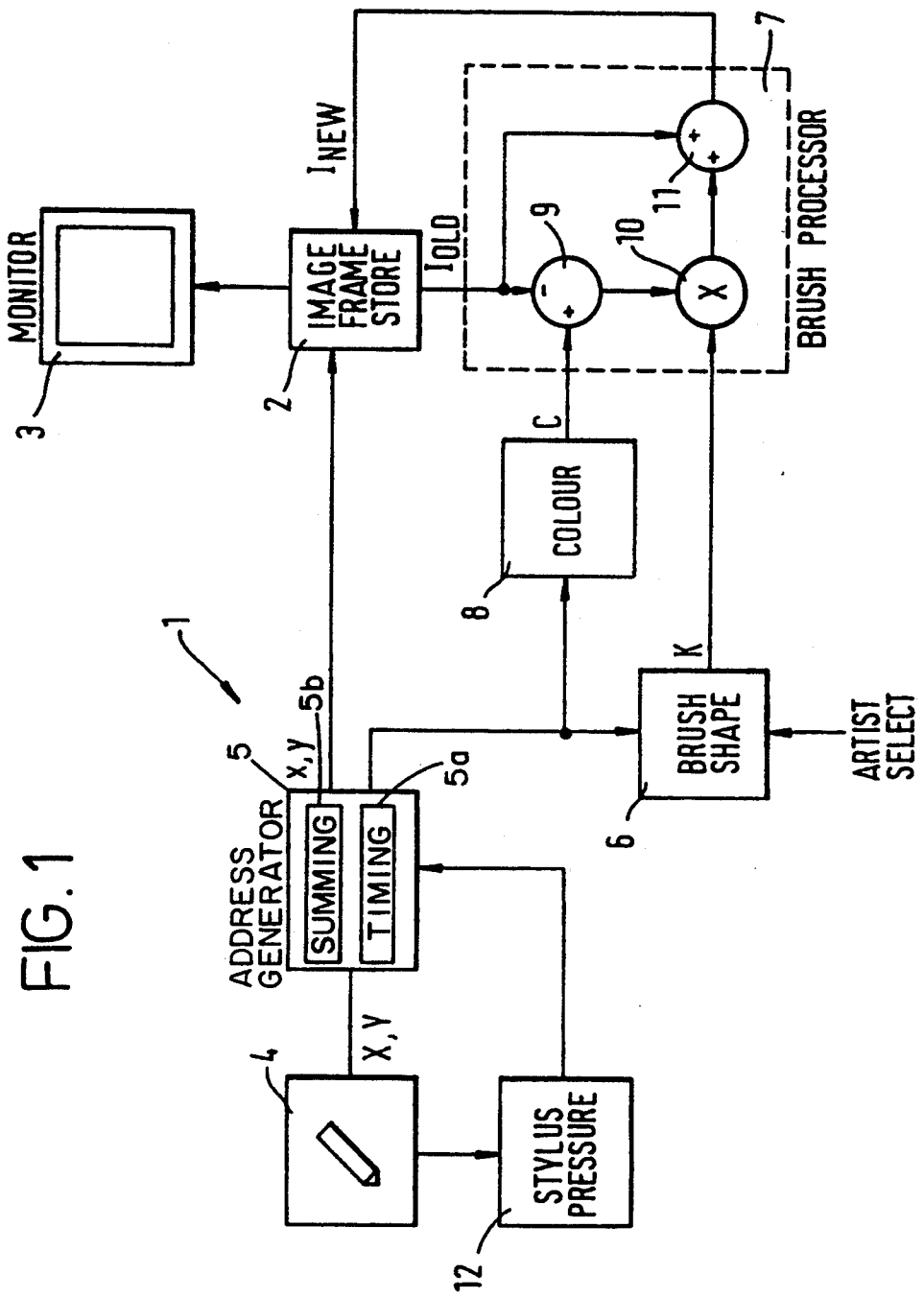
FIG. 1 shows a schematic diagram of an electronic graphic system incorporating a pressure sensitive stylus.

Referring now to FIG. 1 of the accompanying drawings, an electronic graphic system, indicated generally at 1, comprises an image framestore 2 for storing data defining an image being painted, and a monitor 3. The contents of the image framestore are read continuously in raster sequence and the corresponding image for each raster scan is displayed on the monitor 3. The image framestore 2 also includes random access ports for random access writing and reading of data to and from the store 3 independently of the raster sequence reading of data to the monitor 3.

The system 1 also comprises a stylus/touch tablet device 4 by which the user can modify the image data in the framestore 2, and hence the image represented thereby. As the stylus is drawn across the touch tablet signals representative of the instantaneous position X,Y of the stylus are output to an address generator 5. The position information X,Y is provided at a much higher resolution to that of the image framestore 2. That is to say, the spacing between adjacent addresses in the framestore 2 is significantly larger than the spacing between adjacent positions on the touch tablet 4. It follows that for a given pixel location in the framestore 2 there are a number of corresponding positions on the touch tablet 4. For example, the spacing between adjacent positions on the touch tablet may be say eight times smaller than that between adjacent addresses in the framestore 2, and thus there will be sixty four touch tablet positions corresponding to one pixel address in memory. The address generator 5 is therefore arranged among other things to cover the instantaneous X,Y position information into a corresponding pixel address in the framestore 2. The stylus of the stylus/touch tablet device 4 also includes a pressure sensor that outputs a pressure related signal for storage as a parameter in a stylus pressure register 12.

Notional drawing implements are predefined in the system 1 and are selectable by the user from a menu of options (not shown) displayed on the monitor 3. When the artist selects a particular implement, data defining a continuous three dimensional shape covering a patch of pixels and representing the profile of the implement, as described in our above mentioned patents, is stored in a brush shape memory 6 for as long as that implement remains selected. The brush shape data may be a numerical array representing the height of individual elements forming the three dimensional shape or it may be a mathematical expression representing the profile from which expression element height data is calculated as and when required. A selection of predefined colors are also provided in the menu and the artist may select one of these predefined colors or instead may define a color of his own choosing. Data representing the selected color is stored in a color register 8.

As the artist moves the stylus on the touch tablet the position data X,Y is continuously generated by the touch tablet 4 and delivered to the address generator 5. Since a selected implement will usually cover a patch of addresses in the memory, the address generator 5 is also arranged to convert the instantaneous position information X,Y from the touch tablet 4 into a patch of framestore addresses X,Y including the address in the framestore 2 corresponding to the position of the stylus. At the same time, brush shape data from the brush shape memory 6 and color data C relating to the color of the user selected paint from the color register 8 are also input to the brush processor 7. The reading of the brush patch data from the brush shape memory 6 and the color data from the color register 8 is synchronized to the generation of individual addresses within the patch of addresses X,Y by the address generator 5 which outputs said patch addresses to the brush shape memory 6 and the color register 8.

In the brush processor 7 image data $I_{OLD}$ is first subtracted from the color data C by a summer 9. The sum output from the summer 9 is multiplied by the brush data K in a multiplier 10 and the product output from the multiplier 10 is then added to the image data $I_{OLD}$ by an adder 11. The resulting data $I_{NEW}$ output from the adder 11 is written back to the image framestore 10. The operation thus performed by the brush processor 7 is the interpolation of image data $I_{OLD}$ and color data C using the brush data K as an interpolation co-efficient and can be expressed as $$I_{NEW} = KC + (1-K) I_{OLD}.$$

As explained in our abovementioned patents, the address generator 5 is arranged to initiate by way of a pulse signal the processing step described above from time to time. In the system 1, the address generator is arranged to generate the pulse signal at time intervals governed by a predefined value. The address generator 5 comprises a timing means 5a responsive to the parameter for timing the addressing of the store. The address generator further comprises a summing means 5b responsive to the parameter for integrating the stylus position data to determine when the change in position exceeds a parameter determined value. The predefined value is determined by the parameter held in the stylus pressure register 12. Thus for low pressure values pulses are generated at widely spaced time intervals, relatively speaking, and for high pressure values pulses are generated at closely spaced time intervals. The effect of this variable time between processing steps is to change the frequency at which data is read from the image framestore 2, modified by the brush processor 7 and then written back to the framestore 2. Changes in intervals between processing steps therefore affect the rate at which new brush data is stamped into the image data.

The result of this pressure related effect is illustrated in FIG. 2 of the accompanying drawings. In FIG. 2, a line 14 represents the path of the center of the brush as it passes over the image and is related to a path defined by the user manipulating the stylus on the touch tablet. The line painted into the image is made up of a series of overlapping stamps, for example stamps 15, 16 and 17 in FIG. 2, each stamp consisting of patch of pixels which are written into the framestore 2 by the brush processor 7 in the above described read-modify-write operation. The spacing between stamps written into the store 2 is governed by the related parameter in the stylus pressure register 12, and stylus pressure, the rate at which stamps are written into store 2 is therefore related to the pressure applied by the stylus. The center of each brush stamp in FIG. 2 is represented by a cross on the line 14.

The proportion of artist selected color combined with the background color in the final image will depend on the number of times a pixel is modified with new color data. Each modified pixel will have associated with it a geometric series in K, the number of values of K in the series depending on the number of modifications made to the pixel. Individual values of K within the series depend on whether the color contribution is being made by the center of the brush (or another location in the brush profile having a high K value) or by the edge of the brush (or another location in the brush profile having a low K value). Generally speaking, in this mode of operation the size of the patch will be relatively large and values of K will be relatively small. The effect of having low values of K is that many stampings are required to build up the new color in the image.

Of course, in this mode of operation the spacing of the brush stamp centers is also dependant on the speed at which the stylus is moved across the touch tablet by the user. If the stylus is moved quickly across the touch tablet the spacing will be greater and if moved slowly the centers will be closer together, and if held stationary the centers will coincide. It will be appreciated that when the stylus is held stationary over the touch tablet the rate at which new color data is stamped into the framestore will depend solely on the pressure applied via the stylus.

The above described process of only updating image data with new brush stamps at time intervals governed by a pressure related parameter results in the stamping of new data into the image whenever pressure is applied via the stylus on the touch tablet. The system 1 thus simulates painting by an implement which applies paint whenever pressure is applied via the implement. Painting occurs regardless of whether or not there is any movement of the implement and thus the above described operation of the system is similar to the airbrush simulation disclosed in our abovementioned patents.

The system 1 can be modified so that new data is only stamped into the store image when pressure is applied via the stylus and the stylus is moved on the touch tablet. To this end, the address generator 5 can be modified to generate the strobe pulse in response to movement of the stylus on the touch tablet. After a strobe pulse has been generated small increments of high resolution X,Y movement are integrated (without reference to the sign of the movement, i.e. regardless of direction of movement) and when the value of integrated movement exceeds a value determined by the pressure related parameter a new strobe pulse is generated initiating a processing step, and the integrator is reset. In this way, the spacing between the stamping of new image data into the stored image data depends on the pressure applied via the stylus. This mode of operation is similar to the paintbrush simulation disclosed in our above mentioned patents since new color data is only stamped into the stored image data when there is movement of the stylus on the touch tablet.

In both cases the effect of making the drawing process pressure related may be notionally regarded as making the flow rate of paint related to pressure with high flow rates for higher applied pressure and lower flow rates for lower applied pressure.

Turning now to FIG. 3 of the accompanying drawings, there is shown a schematic section view of a stylus which may be used with or without the above described pressure related drawing facility. The stylus, generally indicated as 18 comprises a housing 19 forming the body of the stylus and defining an air passage 20 having an end aperture 21 and a side bore 22. The housing also contains a valve 23 operable by a thumb wheel 24 which value is connectable via an air line 25 to a source (not shown) of pressurized air. A pressure sensor 26 is mounted in the air passage 20 representing pressure at that location near the end of aperture 21 and is arranged to deliver a signal via conductor 27 to the pressure register 12 shown in FIG. 1.

When using the stylus, the operator will open the valve 23 by way of the thumb wheel 24 causing air to flow along the air passage 20 and out through the end aperture 21. Normally the user would place a finger or thumb over the end of the side bore 22 to prevent air escaping via that route. Air pressure in the passage 20 will vary as air flow from the valve is changed, as the user removes his finger from or places it over the end of the bore 22, and as the end aperture 21 is moved toward and away from the touch tablet, represented by the hatched surface 28 in FIG. 3. Thus, the pressure signal from the sensor 26 can be made to vary under user control and will be interpreted as required by the system. The stylus 18 thus provides for a realistic simulation of an air brush in the users hand and the image drawn by the systems in response to use manipulation of the stylus can be made to replicate painting by an air brush using techniques which are per se well known.

Having thus described the present invention by reference to a preferred embodiment it is to be well understood that the embodiment in question is exemplary only and that modifications and variations such as will occur to those possessed of appropriate knowledge and skills may be made without departure from the spirit and scope of the invention as set forth in the appended claims and equivalents thereof.

We claim:

1. An electronic graphic system comprising:
   storing means for storing image data;
   means for providing brush profile data;
   user manipulatable input means, providing position data and pressure data relating to pressure applied thereto by a user, for repeatedly addressing positions in the stored image determined by said position data at instances of time separated from each other by respective periods of time;

processing means for combining user selected color image data with data in the storing means at positions in the stored image addressed by said input means, the combining by said processing means being controlled by said brush profile data;

and wherein said user manipulatable input means includes generating means for generating, in response to said pressure data, a pulse signal comprising a sequence of strobe pulses each corresponding to a respective one of said instances of time, the period of time between each pulse being dependent upon said pressure data, said pulse signal being used to initiate the instances of time at which the user selected color image data and the image data in the storing means are combined.

2. An electronic graphic system as claimed in claim 1, wherein said user manipulatable input means comprises a touch tablet and a stylus positionable thereon by the user, the stylus and touch tablet in combination being arranged to generate said position data identifying the position of the stylus on the touch tablet, wherein said positions in the store image addressed by said input means are calculated from position data.

3. An electronic graphic system as claimed in claim 2, wherein the user manipulatable input means further comprises an address generator responsive to the position data for generating a patch of addresses including the said position in the stored image addressed by said input means.

4. An electronic graphic system as claimed in claim 3, wherein the address generator further comprises a timing means responsive to the pressure data for timing the periods of time between said strobe pulses.

5. An electronic graphic system as claimed in claim 3, wherein the address generator further comprises a summing means responsive to the pressure data for integrating the data representing the position of the stylus on the touch tablet to determine when the position of the stylus has changed by an amount that exceeds a predetermined value, said generating means being arranged to generate said pulse signal in dependence on said position changing to exceed said predetermined value.

6. An electronic graphic system as claimed in claim 1, wherein said processing means combines said user selected color image data and said data in said storing means in a weighted addition determined by said brush profile data to produce combined data which is written to the storing means replacing image data previously there.

7. An electronic graphic system as claimed in claim 1, wherein the brush profile data defines a brush profile having a center and an edge which is defined by pixels with higher values in the vicinity of said center and pixels of lower values in the vicinity of said edge such that the color contribution made by pixels near the center of the profile is greater than that made by pixels near the edge.

8. An electronic graphic system for modifying image data representing an image in accordance with user defined data to create modified data representing a modified image, the system comprising:

a memory for storing image data;

user operable input means for identifying areas of image data in the memory; and modifying means for modifying image data in each identified area by combining the image data with data representing a user selected color in accordance with a preselected algorithm, the input means being sensitive to pressure applied hereto and being arranged to generate a pulse signal comprising a generate a pulse signal comprising sequence of strobe pulses at instances of time separated from each other by respective periods of time determined by the instantaneous pressure applied to the input means by a user, each strobe pulse of the pulse signal being used to initiate the modifying of image data by the modifying means.

9. An electronic graphic system as claimed in claim 8, wherein said period of time is a distance in memory between a point in one defined area and its corresponding point in a subsequently defined area.

10. An electronic graphic system as claimed in claim 8, wherein said interval is a period of time between the identifying of one image area in memory and the identifying of a next image area in memory.

11. An electronic graphic system as claimed in claim 8, wherein said input means comprises a touch tablet and a stylus positionable on the touch tablet by a user, the stylus and touch tablet in combination being arranged to generate instantaneous co-ordinate data representing the position of the stylus on the touch tablet in response to the stylus being brought to the touch tablet and to generate pressure data as pressure is applied to said stylus.

12. An electronic graphic system as claimed in claim 11, wherein said input means further comprises an address generator responsive to said instantaneous co-ordinate data for generating a patch of address data including address data corresponding to the instantaneous co-ordinate data thereby to identify an area in memory.

13. A stylus for use with an electronic graphic facility in creating or manipulating data representing an image, the stylus comprising:

a housing defining a gas passage having an inlet end portion and an outlet end portion, the inlet end portion being connectable to a pressurized gas source such that in use pressurized gas is expelled from the outlet end portion;

user operable valve means in the gas passage for constricting the passage and thereby controlling the pressure at which gas is expelled from the outlet end portion in use; and a pressure sensor mounted in the outlet end portion for sensing the pressure at which gas is expelled from the outlet end portion and outputting a signal related to the pressure sensed thereby, the signal being output for interpretation by the electronic graphic facility.

14. A stylus as claimed in claim 13, wherein the housing further defines a side bore and an opening, the side bore extending from the air passage through a position between said valve means and said outlet portion to said opening, the opening being positioned in the housing such as to facilitate closure thereof by a user thereby to facilitate user control of the pressure of the gas sensed by the sensor.

15. A stylus in combination with a system as claimed in claim 1 for use with an electronic graphic facility in creating or manipulating data representing an image, the stylus comprising:

a housing defining a gas passage having an inlet end portion and an outlet end portion, the inlet end portion being connectable to a pressurized gas source such that in use pressurized gas is expelled from the outlet end portion;

user operable valve means in the gas passage for constricting the passage and thereby controlling the pressure at which gas is expelled from the outlet end portion in use; and a pressure sensor mounted in the outlet end portion for sensing the pressure at which gas is expelled from the outlet end portion and outputting a signal related to the pressure sensed thereby, the signal being output for interpretation by the electronic graphic facility.

16. A stylus in combination with a system as claimed in claim 8 for use with an electronic graphic facility in creating or manipulating data representing an image, the stylus comprising:

a housing defining a gas passage having an inlet end portion and an outlet end portion, the inlet end portion being connectable to a pressurized gas source such that in use pressurized gas is expelled from the outlet end portion;

user operable valve means in the gas passage for constricting the passage and thereby controlling the pressure at which gas is expelled from the outlet end portion in use; and a pressure sensor mounted in the outlet end portion for sensing the pressure at which gas is expelled from the outlet end portion and outputting a signal related to the pressure sensed thereby, the signal being output for interpretation by the electronic graphic facility.

* * * * *